United States Patent Office 3,553,108

Patented Jan. 5, 1971

3,553,108

HEAT SENSITIVE HIGH MOLECULAR WEIGHT RESISTOR

Wataru Shimotsuma, Moriguchi-shi, Akira Mizoguchi, Yokohama, and Toshio Shimizu, Daito-shi, Japan, assignors to Matsushita Electric Industrial Co., Ltd., Osaka, Japan, a corporation of Japan No Drawing. Filed Mar. 20, 1967, Ser. No. 624,155
Claims priority, application Japan, Mar. 23, 1966, 41/18,376; May 16, 1966, 41/31,584
Int. Cl. H01b *1/00;* C07d *49/34*
U.S. Cl. 252—500 3 Claims

ABSTRACT OF THE DISCLOSURE

A process for preparing a heat sensitive high molecular weight resistor excellent performance, which is produced by adding a conductivity-imparting compound to an insulating high molecular weight compound. As the conductivity-imparting compound, one having perchlorate ion, e.g. imidazolium perchlorate, may be employed, which is chemically combined with plasticizer.

The present invention relates to a process for preparing a heat sensitive high molecular weight resistor.

Temperature control is required in most of apparatuses or equipments which aim at temperature. Temperature detection part generally governs the function of temperature control. Geometric change, thermoelectromotive force and resistance change of a metal or metal oxide caused by temperature difference are often used as a temperature detecting element. Such methods of temperature detection, however, are local temperature detection and have defects in that it is impossible to detect the average temperature of the atmosphere in the apparatus or equipment and that these methods have lower sensitivity.

Flexible high molecular weight materials incorporated with a small amount of a surfactant have been recently developed to overcome these defects and have been put to practical use in the temperature control of an electric blanket and the like. These heat sensitive high molecular weight resistors are characterized by higher sensitivity but they have a defect in that they have poor stability.

An object of the present invention is to provide a process for preparing a heat sensitive high molecular weight resistor which has overcome the defects of previous types of resistors. The resistors prepared according to the present invention preserve the same high sensitivity as that of previous types of resistors and show high stability in their continuous prolonged use.

The working temperature of heat sensitive high molecular weight resistors ranges from 20° to 120° C. The sensitivity of previous metal or metal oxide resistors and that of recently developed heat sensitive high molecular weight resistors are compared in Table 1.

TABLE 1.—SENSITIVITY OF TEMPERATURE DETECTING MATERIALS

| | Indication property | Characteristic | Change ratio/ 100° C. |
|---|---|---|---|
| Iron-constantan thermocouple. | Electromotive force | Positive | 6.6 |
| Chromel-alumel thermocouple. | do | do | 6.1 |
| Nickel resistance wire. | Resistance | do | 1.6 |
| Platinum resistance wire. | do | do | 1.4 |
| Thermistor | do | Negative | 4–80 |
| Heat sensitive high molecular weight resistor. | Impedance | do | Ca. 1,000 |

NOTE.—Change ratio was calculated by dividing a value of indication property at 120° C. by that at 20° C. in case of positive characteristic, and by dividing a value of indication property at 20° C. by that at 120° C. in case of negative characteristic.

As clear from Table 1, heat sensitive high molecular weight resistors show 10 to 200 times the sensitivity of metal or metal oxide resistors, and they are the most excellent temperature detecting material at a temperature range of 20° to 120° C.

The heat sensitive high molecular weight resistors are characterized in that they have not only excellent sensitivity but also the same processability as that of general thermoplastic resin and they can satisfy any geometric requirement and that they have flexibility. In previous thermocouples or thermistors it is essential that they have minute shape, but in heat sensitive high molecular weight resistors it is disadvantageous that they have minute shape because their volume intrinsic impedance at 20° C. is $10^9$ to $10^{10}$ Ω-cm.

Therefore, such heat sensitive high molecular weight resistors have been proposed for a quite new application field other than that for which previous temperature detectors have been required.

When the average temperature of a comparatively large area should be detected as in an electric blanket, the heat sensitive high molecular weight resistors display their ability which cannot be obtained by any other method.

As described above, they have processability and can be formed into wire, ribbon or plate. Therefore, they can be fitted to the form of apparatuses or equipments which require temperature detection. Particularly, in electric blankets previous bimetal will be completely replaced by the heat sensitive high molecular weight resistors owing to their flexibility and high sensitiveness.

The heat sensitive high molecular weight resistors which were developed in the early days did not show a satisfactory stability in their prolonged continuous use although they had the above-mentioned epoch-making advantages and application. Thus the impedance of heat sensitive high molecular weight resistors, which is the most important property of the resistors, changed during their prolonged use. This was a fatal defect which prevented a wide application of the resistors.

The early heat sensitive high molecular weight resistors were prepared by incorporating such a surfactant into an insulating thermoplastic resin as stearyldimethylbenzylammonium chloride, cetyldimethylethylammonium chloride, diisobutylphenoxyethoxyethyldimethylbenzylammonium chloride, N-laurylimidazolium chloride, N-methylpyridinium bromide, tetrabutylammonium picrate, etc. As an insulating thermoplastic resin, polyamide, polyethylene, a butadiene-acrylonitrile copolymer, polyvinyl chloride or the like was used.

We have now found that the fact that previous types of heat sensitive high molecular weight resistors do not show a stable impedance is caused by the interaction of the insulating high molecular weight material and the surfactant used. Most of the surfactants used in previous types of resistors are quaternary ammonium salts as mentioned above. As the insulating thermoplstic resin, polyvinyl chloride has been commercially used, of which decomposition is accelerated by dehydrochlorination under the existence of amines. The decomposition of the compound fluctuates the stability of impedance of the resistors. The detailed mechanism is shown in the literatures regarding the accelerating effect of decomposition by cationic surfactants on polyvinyl chloride and vinyl chloride-vinyl acetate copolymers. These combinations are considered unsuitable for heat sensitive high molecular weight resistors. Even for the other insulating high molecular weight materials, the surfactants used in previous types of resistors cause the decomposition of the materials at a temperature encountered in the preparation of heat sensiitve high molecular weight resistors because the decomposition temperature of the surfactants themselves is as relatively low as 100° to 300° C. The surfactants apt to decompose themselves, and when they are added to, for example, polyamide, not only the surfactants themselves, but also polyamide easily decompose.

In accordance with the present invention, a high molecular weight resistor having an excellent performance is provided by adding a conductivity-imparting compound to an insulating thermoplastic resin.

The conductivity-imparting compounds which may be used in the present invention include conductivity-imparting agents having a perchlorate ion, conductive plasticizers obtained by chemically bonding a plasticizing portion with a conductivity-imparting portion and the like. The perchlorate ion is itself stable, beside prevent the decomposition.

The preferable conductivity-imparting agents include 1-vinyl-2-methyl-3-benzylimidazolin perchlorate,

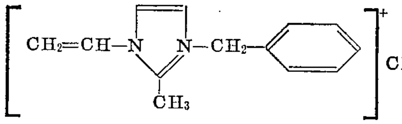

1 - vinyl - 2 - methyl-3-dimethylbenzylimidiazolium perchlorate,

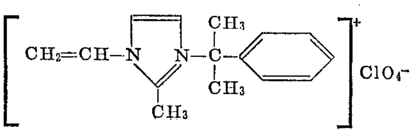

1-vinyl-2-methyl - 3 - carboxymethylimidazolium perchlorate,

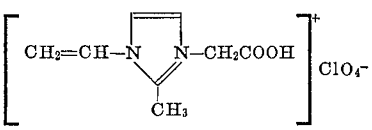

1,3-di-β-hydroxyethyl-2-methylimidazolium perchlorate,

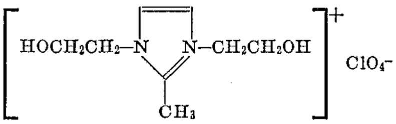

n-octyl-{9-[β-(2 - ethyl-3-benzyl-3-peroxychloroimidazonyl)ethoxy]-10-hydroxy} stearate,

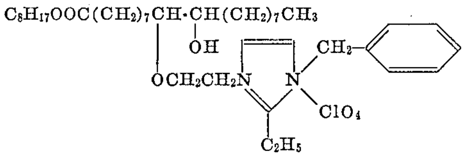

di-n-octyl-mono-β-(2-methyl-3-benzyl - 3 - peroxychloroimidazonyl)ethyl phosphate,

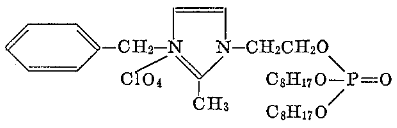

The preferable conductive plasticizers are obtained by chemically bonding a plasticizing portion to such a conductivity-imparting portion as a pyridine, quinoline, imidazoline or imidazol nucleus or a quaternary ammonum salt such as tetrabutyl ammonium picrate. Particularly preferable conductivity imparting portions are imidazol nucleuses represented by a general formula

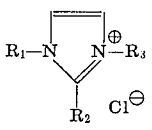

wherein $R_1$ is an epoxy, aminopropyl, hydroxyethyl, carboxymethyl, vinyl or aryl group; $R_2$ is a $C_nH_{2n+1}$ group wherein $n$ is preferably 1 to 8; and $R_3$ is a benzyl, dimethylbenzene or carboxyethyl group.

Illustrative of the preferable conductive plasticizers are di-octyl-cyanurate [(2-ethyl-3-benzyl-3 - chloroimidazonyl)-2-hydroxyethyl]ether,

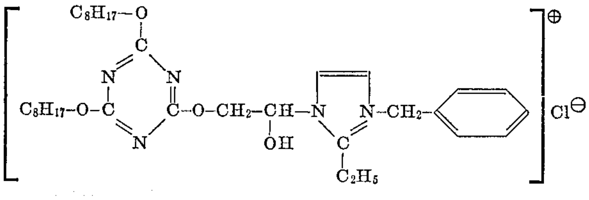

1 - [3 - (2,4 - didecyclcarboxyphenylamindo)-propyl]-2-ethyl-3-benzylimidazolium chloride,

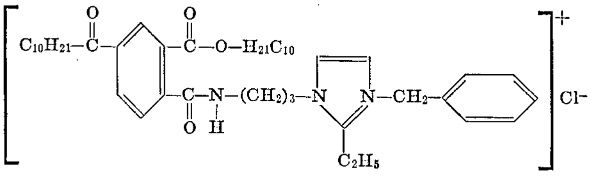

1-[2-tris(n - octylcarboxymethyl)ethylcarboxymethyl]-2-ethyl-3-benzylimidazolium chloride,

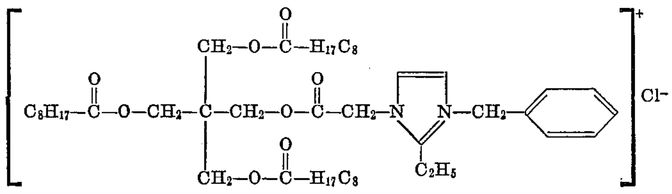

3.5. di-n-octylcyanurate [β-(2-methyl - 3 - benzylimidazolium perchlorate)-β′-hydroxyethyl]ether,

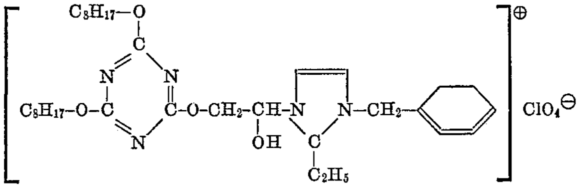

1 - [3 - (2,4-didecylcarboxy-phenylamido)propyl]-2-ethyl-3-benzylimidazolium perchlorate,

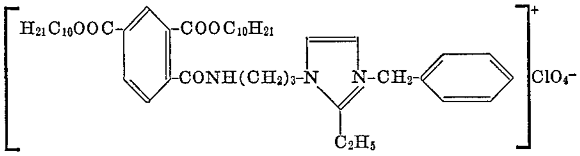

(2-n-octylcarboxyphenyl) - amidoethyl-di-β-hydroxyethylammonium perchlorate,

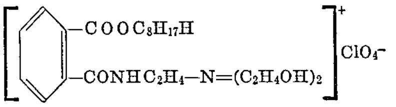

1-[2 - tris(decylcarboxymethyl)ethylcarboxymethyl] - 2-ethyl-3-β-hydroxyethylimidazolium perchlorate,

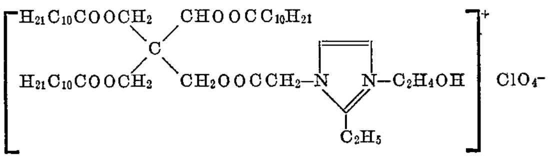

n - decyl[9 - hydroxy - 10(peroxychloro-tris-β-hydroxyethyl)amino]stearate.

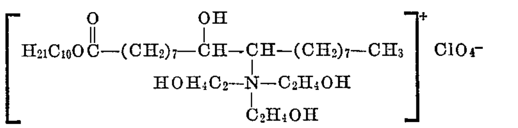

and etc.

As a thermoplastic resin polyvinyl chloride, polyamide, a cellulose ester, an acrylate ester, an acrylonitrile-butadiene copolymer, polyurethane, an acrylonitrile-acrylate ester copolymer, an ethylene-propylene copolymer, polyvinylidene chloride, polypropylene, polyethylene, and so on are preferable.

The following examples wherein polyvinyl chloride was used as a base material of the heat sensitive high molecular weight resistor are illustrative only of the present invention and should not be construed as limiting the scope thereof, which is properly delineated in the appended claims. The polyvinyl chloride is the most chemically unstable insulating thermoplastic resin.

(I) Use of conducitvity-imparting agent

EXAMPLE I (a) Synthesis of 1-vinyl-2-methyl-3-benzylimidazolium perchlorate

A solution of 17 grams of 1-vinyl-2-methylimidazole in 8 grams of methyl alcohol and 23 grams of benzyl perchlorate were charged into a 100 ml. three neck flask and the mixture was reacted at 40° C. for 15 hours. The resultant reaction product was concentrated and then cooled to obtain 20 grams of crystals.

(b) Preparation of PVC compound

To a PVC compound consisting of 100 grams of polyvinyl chloride ($\bar{P}$=1,200), 48 grams of dioctyl phthalate, 0.5 gram of calcium stearate and 0.3 gram of stearic acid, 2.3 grams of the above-mentioned crystals obtained in (a) were added. The mixture was kneaded on a heated roller at 160° C. The resultant sheet of a heat sensitive high molecular weight resistor was formed into a size of 50 x 50 x 1 mm. by a press at 165° C. to obtain a specimen for measuring its properties.

EXAMPLE 2

(a) Synthesis of 1,3-di-β-hydroxyethyl-2-methylimidazolium perchlorate

A solution of 15 grams of 1-β-hydroxyethyl-2-methylimidazole in 15 grams of ethyl alcohol was charged into a 100 ml. four neck flask. 28 grams of ethylene oxide was then blown into the flask while maintaining the temperature at 80° C. The reaction product was neutralized with 60% perchloric acid and then concentrated.

(b) Preparation of PVC compound 100 grams of polyvinyl chloride ($\bar{P}$=1,200), 50 grams of dioctyl phthalate, 3 grams of barium stearate and 0.7 gram of stearic acid were dry blended at 100° C. for 30 minutes. The mixture was kneaded on a heated roller at 160° C. while 4.7 grams of the above-mentioned concentrate obtained in (a) was added. The resultant sheet of a heat sensitive high molecular weight resistor was formed into a size of 50 x 50 x 1 mm. by a press at 165° C. to obtain a specimen for measuring its electrical properties.

EXAMPLE 3

(a) Synthesis of 1-[1-hydroxy - 2 - (dioctyl-oxycyanuric-oxy)ethyl]-2-methyl-3-benzylimidazonium perchlorate 1 mol of cyanuric trichloride, 2.2 mols of sodium octyloxide, and 2.5 mols of 1-(sodium-oxyethyl)-2-methyl-3-benzyl imidazoliumperchlorate were dissolved in 1000 ml. of benzene. Reaction was carried out for 16 hours at 60° C. and thereafter concentration was effected until the total amount became 400 ml. The reaction product was extracted with 500 ml. of ether to obtain about 0.6 mol of the desired product.

(b) Preparation of PVC compound 100 grams of polyvinyl chloride ($\bar{P}$=1,200), 43 grams of dioctyl phthalate, 2.0 grams of calcium stearate and 0.8 gram of stearic acid were dry blended at 100° C. for 20 minutes. The mixture was then kneaded on a heated roller at 160° C. while 1.8 grams of the above-mentioned crystals obtained in (a) were added. The resultant sheet of a heat sensitive high molecular weight resistor was formed into a size of 50 x 50 x 1 mm. by a press at 170° C. to obtain a specimen for measuring its properties.

(II) Use of conductive plasticizer

EXAMPLE 4

(a) Synthesis of dioctylcyanurate[β-(2-methyl-3-benzylimidazonyl perchlorate)-β′-hydroxyethyl]ether 1 mol of tris(β-hydroxyethyl)isocyanate, 2 moles of n-octyl alcohol and 1 mol of 1-epoxyethyl-2-methyl-3-benzylimidazolium perchlorate were charged into a flask. The mixture was subjected to dehydration condensation at 90° C. for 20 hours using 1.5 moles of toluene for removing water by azeotropic distillation and 0.1 mol of perchloric acid as a catalyst. After the reaction, 0.5 mole of a product was obtained by ether extraction.

(b) Preparation of PVC compound 100 grams of polyvinyl chloride ($\overline{P}$=1,200), 23 grams of dioctyl phthalate, 1.3 grams of barium stearate, 0.8 gram of stearic acid and 27 grams of the conductive plasticizer obtained in (a) were dry blended at 100° C. for 30 minutes. The mixture was kneaded on a heated roller at 160° C. for 10 minutes. The resultant sheet of a heat sensitive high molecular weight resistor was formed into a size of 50 x 50 x 1 mm. by a press at 170° C. to obtain a specimen for measuring its properties.

EXAMPLE 5

(a) Synthesis of 1-[3-(2,4-didecylcarboxyphenylamido)-propyl]-2-ethyl-3-benzylimidazolium perchlorate 1 mol of didecyl trimellitate and 1.3 moles of 1-aminopropyl - 2 - ethyl - 3-benzylimidazolium perchlorate were charged into a three neck flask. The mixture was then heated at 210° C. for 4 hours to distill 1 mol of water. 2 moles of ethyl acetate wah added to the reaction product and unreacted imidazolium derivative was extracted with five 200 ml. portions of water. Water dissolved in the product is then removed by distillation at 70° C. and 10 mm. Hg. Thus an amber-colored viscous material was obtained.

(b) Preparation of PVC compound 100 grams of polyvinyl chloride ($\overline{P}$=1,200), 23 grams of dioctyl phthalate, 1.7 grams of calcium stearate, 0.6 gram of stearic acid and 27 grams of the material obtained in (a) were charged into a beaker and the mixture was stirred at 100° C. for 30 minutes. The mixture was then kneaded on a heated roller at 165° C. for 17 minutes. The resultant heat sensitive high molecular weight resistor sheet was formed into a size of 50 x 50 x 1 mm. by a press at 175° C. to obtain a specimen for measuring its properties.

EXAMPLE 6

(a) Synthesis of (2-octylcarboxyphenyl)amidoethyl-di-β-hydroxyethylammonium perchlorate 1 mol of n-octyl alcohol was added to 1.2 moles of phthalic anhydride. The mixture was reacted at 160° C. for 20 hours to form 1 mol of mono-n-octylphthale. 1 mol of aminoethylethanolamine was then added to 1 mol of mono-n-octyl phthalate. The mixture was subjected to dehydration condensation at 190° C. for one hour. 1.5 moles of water was added to the system and 3 moles of ethylene oxide was blown into the mixture at 80° C. and the mixture was stirred for 20 minutes. The reaction product was neutralized with 60% perchloric acid and 10 moles of dioxane was added to extract unreacted materials. When the product was dried under a reduced pressure, a conductive plasticizer was obtained in the form of a deep amber-colored viscous material.

(b) Preparation of PVC compound 100 grams of polyvinyl chloride ($\overline{P}$=1,200), 10 grams of dioctyl phthalate, 37 grams of the plasticizer obtained in (a), 1.3 grams of calcium stearate and 0.5 gram of stearic acid were charged into a beaker. The mixture was stirred at 100° C. for 20 minutes. The mixture was then kneaded on a heated roller at 170° C. to form a heat sensitive high molecular weight resistor in the form of sheet. The sheet was then formed into a size of 50 x 50 x 1 mm. to obtain a specimen for measuring its properties.

EXAMPLE 7

(a) Synthesis of 1-[2-tris(decylcarboxymethyl)ethylcarboxymethyl]-2-ethyl-3-β-hydroxyethylimidazolium perchlorate 1 mol of tridecyl ester of pentaerythritol and 1.1 mols of 1-carboxymethyl-2-ethyl-3-β-hydroxyethylimidazolium perchlorate was subjected to dehydration condensation at 150° C. for 6 hours. 3 mols of methyl acetate was added to the reaction product and unreacted materials were extracted with water. Methyl acetate and water were removed by the distillation of the remaining liquid under a reduced pressure. Thus a product was obtained.

(b) Preparation of PVC compound 100 grams of polyvinyl chloride ($\overline{P}$=1,200), 30 grams of a pentaerythritol plasticizer, 18 grams of the plasticizer obtained in (a), 1.3 grams of calcium stearate and 0.5 gram of stearic acid were stirred at 100° C. for 15 minutes. The mixture was then kneaded on a heated roller at 165° C. to obtain a heat sensitive high molecular weight resistor in the form of sheet. The sheet was formed into a size of 50 x 50 x 1 mm. by a press at 170° C. to obtain a specimen for measuring its properties.

EXAMPLE 8

(a) Synthesis of n - decyl[9 - hydroxy-10-(peroxychloro-tris-β-hydroxyethyl)amino]stearate 2 mols of diethanolamine was added to 1 mol of octyl epoxystearate. The mixture was heated at 240° C. for 1.5 hours to add the epoxy to the amine. 3 mols of methyl acetate was added to the reaction product and unreacted amine was extracted with water. The product was neutralized with 60% perchloric acid. When the ester and water were removed by distillation under a reduced pressure, an amber-colored viscous product was obtained.

(b) Preparation of PVC compound 100 grams of polyvinyl chloride ($\overline{P}$=1,200), 10 grams of dioctyl phthalate, 17 grams of octyl epoxystearate, 13 grams of the plasticizer obtained in (a), 1.5 grams of barium stearate and 0.5 gram of stearic acid were stirred at 100° C. for 20 minutes. The mixture was then kneaded on a heated roller at 165° C. to obtain a heat sensitive high molecular weight resistor in the form of sheet. The sheet was then formed into a size of 50 x 50 x 1 mm. by a press at 170° C. to obtain a specimen for measuring its properties.

In order to compare with the heat sensitive high molecular weight resistors obtained by the present invention, four previous types of heat sensitive high molecular weight resistors were prepared by adding 1.5 grams of (1) stearyldimethylbenzylammonium chloride, (2) diisobutylphenoxyethoxyethyldimethylbenzylammonium chloride, (3) N-laurylimidazolium chloride and (4) N-methylpyridinium bromide, respectively, to a PVC compound consisting of 100 grams of polyvinyl chloride ($\overline{P}$=1,200), 50 grams of dioctyl phthalate, 1.5 grams of calcium stearate and 0.5 gram of stearic acid, kneading the mixture and then forming the resultant heat sensitive high molecular weight resistor into a size of 50 x 50 x 1 mm. The properties of the resistors were measured according to the following methods.

(a) Measurement of impedance dependence on temperature

A 30 x 30 mm. silver-painted electrode was attached to the central part of both the surfaces of the specimens obtained in Examples 1 to 8 and of the above-mentioned previous types 1 to 4, respectively. Impedance at each temperature was measured at 60 Hz and an electrical field strength of 1 kv./cm. by a voltage drop method using a series connection between the specimen and a non-inductive variable resistance. Specific impedance was obtained by multiplying the measured value by an electrode area (9 cm.$^2$) and dividing by the thickness of the specimen (0.1 cm.).

In order to evaluate impedance dependence on temperature, thermistor B constant was calculated by Equation 1.

$$B=\frac{ln\frac{Z_{sp}(0)}{Z_{sp}}}{\frac{1}{T_0}-\frac{1}{T}}(° \text{ K.}) \qquad (1)$$

wherein, for impedance dependence on temperature between 30° and 60° C., $Z_{sp(0)}$: Specific impedance at 30° C.
$Z_{sp}$: Specific impedance at 60° C.
$T_0$: 30° C.+273=303° K.
T: 60° C.+273=333° K.

and, for impedance dependence on temperature between 60° and 100° C., $Z_{sp(0)}$: Specific impedance at 60° C.
$Z_{sp}$: Specific impedance at 100° C.
$T_0$: 60° C.+273=333° K.
T: 100° C.+273=373° K.

The reasons for dividing the impedance dependence on temperature into those in two temperature ranges in the present invention are that logarithmic impedance is not exactly directly relative to $1/T$ and that the temperature in practical use of the heat sensitive high molecular weight resistors ranges from 30° to 60° C. for an electric blanket and from 60° to 100° C. for the other apparatuses or equipments.

(b) Thermal stability of impedance 50 x 50 x 1 mm. heat sensitive high molecular weight resistor sheet was sandwiched between 30 x 30 mm. electrodes of 20 mesh copper wire net, and the outer surfaces thereof were coated with a 50 x 50 x 1 mm. insulating PVC compound. The whole was pressed and welded by a press at 175° C., and then placed in a circulating air oven at 120° C. Impedance was measured in the same manner as in (a) and its change with time was observed. Thus a change ratio for time was calculated by Equation 2 in order to evaluate the thermal stability of impedance.

$$\Delta Z=Z_t/Z_0 \qquad (2)$$

wherein $Z_0$: Impedance before aging
$Z_t$: Impedance after aging for $t$ hours.

The characteristics of the heat sensitive high molecular weight resistors are shown in Tables 2 and 3.

TABLE 2.—SPECIFIC IMPEDANCE AND IMPEDANCE DEPENDENCE ON TEMPERATURE OF HEAT SENSITIVE HIGH MOLECULAR WEIGHT RESISTORS

| | $Z_{sp}$ (Ω cm.) | | | B (° K.) | |
|---|---|---|---|---|---|
| | 30° C. | 60° C. | 100° C. | 30°-60° C. | 60°-100° C. |
| Example: | | | | | |
| 1 | $2.6\times10^9$ | $1.7\times10^8$ | $8.9\times10^6$ | 9,000 | 9,200 |
| 2 | $3.1\times10^9$ | $2.0\times10^8$ | $9.8\times10^6$ | 9,100 | 9,400 |
| 3 | $3.3\times10^9$ | $1.9\times10^8$ | $7.5\times10^6$ | 9,500 | 10,000 |
| 4 | $3.1\times10^9$ | $2.5\times10^8$ | $6.8\times10^6$ | 8,400 | 11,700 |
| 5 | $2.6\times10^9$ | $1.8\times10^8$ | $9.1\times10^6$ | 8,900 | 9,300 |
| 6 | $3.3\times10^9$ | $1.9\times10^8$ | $7.5\times10^6$ | 9,500 | 10,000 |
| 7 | $3.3\times10^9$ | $2.6\times10^8$ | $8.3\times10^6$ | 8,400 | 10,700 |
| 8 | $3.0\times10^9$ | $2.1\times10^8$ | $8.5\times10^6$ | 9,000 | 10,000 |
| 9 | $1.5\times10^9$ | $8.3\times10^7$ | $4.8\times10^5$ | 9,600 | 8,600 |
| 10 | $9.8\times10^8$ | $5.9\times10^7$ | $4.2\times10^6$ | 9,300 | 8,700 |
| Previous type: | | | | | |
| 1 | $2.9\times10^9$ | $2.2\times10^8$ | $5.6\times10^6$ | 8,600 | 11,400 |
| 2 | $3.2\times10^9$ | $1.8\times10^8$ | $7.3\times10^6$ | 9,500 | 10,000 |
| 3 | $3.0\times10^9$ | $2.1\times10^8$ | $8.5\times10^6$ | 9,000 | 10,000 |
| 4 | $2.6\times10^9$ | $1.8\times10^8$ | $9.1\times10^6$ | 8,900 | 9,300 |

TABLE 3.—THERMAL STABILITY OF IMPEDANCE OF HEAT SENSITIVE HIGH MOLECULAR WEIGHT RESISTORS

| | ΔZ | | | | | | |
|---|---|---|---|---|---|---|---|
| | 0 hr. | 100 hr. | 200 hr. | 300 hr. | 400 hr. | 500 hr. | 600 hr. |
| Example: | | | | | | | |
| 1 | 1.0 | 1.1 | 1.3 | 1.5 | 1.7 | 1.9 | 2.0 |
| 2 | 1.0 | 1.1 | 1.3 | 1.5 | 2.0 | 2.2 | 2.4 |
| 3 | 1.0 | 1.2 | 1.2 | 1.1 | 1.8 | 2.3 | 2.8 |
| 4 | 1.0 | 0.9 | 1.1 | 1.0 | 1.1 | 1.5 | 1.9 |
| 5 | 1.0 | 1.2 | 1.2 | 1.4 | 1.3 | 1.8 | 2.1 |
| 6 | 1.0 | 1.0 | 1.0 | 1.2 | 1.0 | 1.1 | 1.3 |
| 7 | 1.0 | 1.0 | 1.1 | 0.9 | 1.1 | 1.0 | 1.0 |
| 8 | 1.0 | 1.0 | 1.0 | 1.1 | 1.1 | 1.1 | 1.2 |
| 9 | 1.0 | 0.9 | 0.9 | 1.0 | 1.0 | 1.1 | 1.1 |
| 10 | 1.0 | 1.0 | 1.1 | 1.0 | 1.1 | 1.2 | 1.4 |
| Previous type: | | | | | | | |
| 1 | 1.0 | 1.9 | 4.3 | 5.9 | 7.0 | 7.3 | 7.6 |
| 2 | 1.0 | 1.8 | 2.5 | 3.4 | 4.6 | 5.1 | 5.9 |
| 3 | 1.0 | 1.5 | 3.5 | 4.9 | 7.0 | 7.9 | 8.6 |
| 4 | 1.0 | 1.8 | 3.6 | 7.1 | 9.3 | 11.0 | 13.1 |

These heat sensitive high molecular resistors are evaluated as follows:

(a) Impedance dependence on temperature

As clear from Table 2, the impedance dependence on temperature of the heat sensitive high molecular weight resistors according to the present invention ranges from 8400 to 9600° K. in a lower temperature range of 30° to 60° C. and from 9600 to 11,700° K. in a higher temperature range of 60° to 100° C. These values are equal to the sensitivity of previous types of heat sensitive high molecular weight resistors. Thus, if they are combined with an electric circuit, an amplifying circuit is unnecessary for detecting the temperature in contrast with the application of thermoelectromotive force or resistance change of metals caused by temperature change. This leads to the simplification of apparatuses or equipments and has a great industrial effect.

In previous types of heat senistive high molecular weight resistors, the resistance of an insulating high molecular compound is reduced by the addition of a surfactant. It has been heretofore considered that such an effect can be achieved only with a surfactant, but we have now found that surface activity is not necessarily required to bring about such an effect. A surfactant has been considered to be compatible with the insulating high molecular compound and dissociate ions which take part in electric conduction since the surfactant has an oleophilic group and a hydrophilic group in its molecule. The amount of the surfactant added may be at most 5 percent in order to give a satisfactory effect. Taking it the other way round, it may be impossible to add more than 5% of the surfactant. This is confirmed by the result of our experiment that, when the insulating high molecular compound was a plasticized polyvinyl chloride compound, gelation of the compound was unsatisfactory on a heated roller and kneading operation was difficult at 5% addition and became quite impossible on the heated roller at 7 to 8%.

Therefore, previous qualitative and wishful thinking that a surfactant will be compatible with an insulating high molecular compound must be corrected. Even if the addition of a surfactant is not significant in the compatibility, it will be considered a characteristic of the surfactant that a heat sensitive high molecular weight resistor can be prepared only by adding a small amount of the surfactant to an insulating high molecular compound. However, not only a surfactant but also a conductivity-imparting agent used in the present invention can achieve such an object.

Therefore, the use of a surfactant is not essential in the preparation of a heat sensitive high molecular weight resistor. The addition of a conductivity-imparting material according to the present invention provides a heat sensitive high molecular weight resistor having the same sensitivity as that of previous types of resistors.

The differences between surfactants used in previous types of heat sensitive high molecular weight resistors and conductivity-imparting agents and conductive plasticizers used in the present invention are shown in Table 4.

TABLE 4

| Agent | Amount added, percent | Characteristics |
|---|---|---|
| Surfactants | 1.0–5 | Shows surface activity (see Table 5). |
| Conductivity imparting agents. | 0.1–5 | No surface activity (see Table 5). |
| Conductive plasticizers | 6–50 | Shows plasticizing action and conductivity-imparting effect. |

TABLE 5.—SURFACE ACTIVITY

[Surface tension of aqueous solution at 25° C. by liquid drop method]

| | Surface Tension (dynes/cm.) | | | |
|---|---|---|---|---|
| Amount added | 0% | 0.25% | 0.50% | 1.00% |
| Previous type: | | | | |
| 1 | 71.8 | 37.6 | 37.0 | 36.5 |
| 2 | 71.8 | 35.7 | 35.5 | 34.1 |
| Example: | | | | |
| 1 | 71.8 | 71.1 | 70.6 | 70.0 |
| 2 | 71.8 | 71.5 | 72.0 | 72.0 |

NOTE.—The above values are only illustrative.

(b) Estimation of thermal stability of impedance

As clear from Table 3, $\Delta Z_{600}$ of previous types of heat sensitive high molecular weight resistors ranges from 6 to 13 and is unstable, while $\Delta Z_{600}$ of the resistors obtained in Examples 1 to 5 using a conductivity-imparting agent ranges from 1.9 to 2.8 and their stability is 3 to 4 times as high as that of previous types of resistors. Further, $\Delta Z_{600}$ of the resistors obtained in Examples 6 to 10 using a conductive plasticizer ranges from 1.0 to 1.4 and shows 6 to 10 times the stability of previous types of resistors. Thus the effect of the present invention is remarkable.

It is considered to be due to perchloric anion which is a constituent of a conductivity-imparting agent or a conductive plasticizer that such a stable heat sensitive high molecular weight resistor can be provided according to the present invention. In this specification the present invention has been illustrated only on referring to the use of polyvinyl chloride as an insulating high molecular material for a heat sensitive high molecular weight resistor. As described above, polyamide, polyethylene, polypropylene, a nitrile-butadiene copolymer, polyvinyl acetate, etc. may be also as the insulating high molecular material. However, polyvinyl chloride will be the most conventional material of them which is steadily available. The processing machines for the material have been also extremely developed. Although polyvinyl chloride is liable to thermal decomposition, all the same effect as in any other insulating high molecular material may be obtained according to the present invention.

The effect of the additive material such as a surfactant or a conductivity-imparting agent on the decomposition of polyvinyl chloride will be described in detail.

The thermal decomposition of polyvinyl chloride is accelerated by the presence of nitrogen atom. It is known that the decreasing order of ability of nitrogen atom to accelerate the decomposition of polyvinyl chloride is as follows:

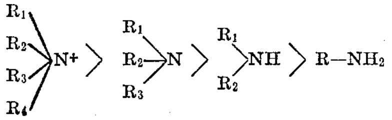

As clear from the above-mentioned constitutional formulas, the additive materials are characterized by containing a quaternary nitrogen atom. Thus, most of the additive materials are in such a state that polyvinyl chloride is most liable to thermal decomposition. This is due to the electron density of the quaternary nitrogen atom. In the above amine order, the greater the number of alkyl group bonded to nitrogen atom, the larger decomposition accelerating effect becomes. In a bond between alkyl and nitrogen, a quaternary amine is in the largest electron density state that a nitrogen atom can take, because alkyl may push an electron toward nitrogen or nitrogen may attract an electron. Even if a surfactant used in previous types of resistors and a conductivity-imparting material used in the resistors of the present invention are situated at the same order, a distinct difference is found in their thermal stability of impedance owing to the difference of constituent anions, that is, a halogen ion and a perchlorate ion. A perchlorate ion is reported to have the largest electro-negativity in a non-aqueous solution among various ions. When a perchlorate ion is bonded to a nitrogen ion, the electron density of a quaternary nitrogen atom is lower than when a halogen ion bonded to the nitrogen ion. Then polyvinyl chloride is not decomposed and consequently impedance becomes stable. Further, impedance will be changed by the transfer of an ionic material from the system. In polyvinyl chloride the chemical stability of compound plays a larger role on stability of impedance than the transfer of an ionic material. In other insulating high molecular materials such as polyethylene and polypropylene, however, the latter is significant. In polyethylene or polypropylene, no plasticizer is required. If a heat sensitive high molecular weight resistor is composed of such a high molecular insulating material as polyvinyl chloride or polyvinyl acetate, which requires a plasticizer, a conductive plasticizer is most preferable as clear from the examples of the present invention.

The conductive plasticizer has both ability to plasticize a high molecular insulating material and ability to impart conductivity. No additive material having excellent compatibility has been found. Any additive material, therefore, will always bleed out after a long period of time and the composition of the system will be changed.

As described above, the present invention may provide a high molecular weight resistor having particularly excellent thermal stability of impedance and negative temperature-impedance characteristic which can be used in such an application as an electric blanket having a omparatively large temperature career and a high frequency.

What we claim is:

1. Plastic thermosensitive material consisting essentially of a mixture of insulating thermoplastic resin and a derivative selected from the group consisting of (1) imidazol derivatives and (2) phthaloyl derivatives as shown below, said derivative being added in such amount as can produce a resistivity of $10^8$–$10^9$ cm. at 30° C., a thermistor coefficient of 6000–1200° K. and a thermal stability of —2∼+3, (1) 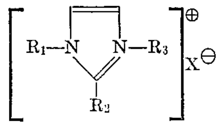

(2) 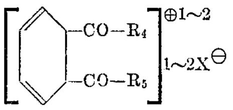

wherein $R_1$, $R_2$ and $R_3$ is dialkyl phosphone, alkoxycarbonylphenylamidoethyl, vinyl, phenylalkyl, carboxyalkyl, hydroxyalkyl, dialkoxycyanuric or tri (alkyloyloxy) alkoxycarbonylalkyl radical, $R_4$ and $R_5$ is alkoxy or hydroxyalkylammoniumalkylamino radical, *n* is $C_nH_{2n+1}$— or —$C_nH_{2n}$— in said radical being 1–10, and X is chlorine or perchlorate.

2. A plastic thermosensitive material according to claim 1, wherein chloride or perchlorate is a member selected from the group consisting of:

1-vinyl-2-methyl-3-benzylimidazolium perchlorate,
1-vinyl-2-methyl-3-dimethylbenzylimidazolium perchlorate,
1-vinyl-2-methyl-3-carboxymethylimidazolium perchlorate,
1,3-diβ hydroxyethyl-2-methylimidazolium perchlorate,
n-octyl {9-[β-(2-ethyl-3-benzyl-3-perchloroimidazonyl) ethoxy]-10-hydroxy} stearate,
di-n-octylmono-β-(2-methyl-3-benzyl-3-perchloroimidazonyl)ethyl phosphate,
1-[1-hydroxy-2-(dioctyloxy cyanuricoxy)ethyl]-2-methyl-3-benzylimidazolium perchlorate, 1-[3-(2,4-di-decylcarboxyphenylamido)-propyle]-2-ethyl-2-benzylimidazolium chloride,
1-[2-tris-(n-octylcarboxymethyl)ethylcarboxymethyl]-2-ethyl-3-benzylimidazolium chloride,
1-[1-hydroxy-2-(dioctyloxycyanuricoxy)ethyl]-2-methyl-3-benzylimidazolium chloride and
(2-n-octyl-carboxyphenyl)-amidoethyl-di-β-hydroxyethylammonium perchlorate.

3. A plastic thermosensitive material according to claim 1, wherein the insulating thermoplastic resin is a member selected from the group consisting of a polyvinyl chloride, a polyamide, a cellulose ester, an acrylate ester, an acrylonitrile-butadiene copolymer, a polyurethane, and acrylonitrile-acrylate ester copolymer, an ethylene-propylene copolymer, a polyvinylidene chloride, a polypropylene and a polyethylene.

References Cited

UNITED STATES PATENTS

| | | | |
|---|---|---|---|
| 2,778,748 | 1/1957 | Rowe | 260—309.6 |
| 2,878,233 | 3/1959 | Harrison | 260—309.6 |
| 3,216,957 | 11/1965 | Krumm | 260—309.6 |
| 3,346,444 | 10/1967 | Lupinski | 252—500 |
| 3,448,177 | 6/1969 | Goodings | 252—500 |
| 3,138,610 | 6/1964 | Buc | 260—309.6 |
| 3,205,092 | 9/1965 | Rosenberg | 117—138.8 |
| 3,210,312 | 10/1965 | Rosenberg et al. | 260—30.2 |

DOUGLAS J. DRUMMOND, Primary Examiner

U.S. Cl. X.R.

260—309.6